(12) United States Patent
Kogure et al.

(10) Patent No.: US 12,255,444 B2
(45) Date of Patent: Mar. 18, 2025

(54) WIRE HARNESS

(71) Applicants: Yazaki Corporation, Tokyo (JP);
AISIN CORPORATION, Aichi (JP)

(72) Inventors: Naoto Kogure, Shizuoka (JP); Kosuke Tomosada, Shizuoka (JP); Kyosuke Okuda, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 176 days.

(21) Appl. No.: 18/160,636

(22) Filed: Jan. 27, 2023

(65) Prior Publication Data
US 2023/0261449 A1    Aug. 17, 2023

(30) Foreign Application Priority Data

Feb. 17, 2022  (JP) .................................. 2022-022665

(51) Int. Cl.
*H02G 3/04* (2006.01)
*B60R 16/02* (2006.01)

(52) U.S. Cl.
CPC ....... *H02G 3/0462* (2013.01); *B60R 16/0215* (2013.01)

(58) Field of Classification Search
CPC .......... B60R 6/0207; H01B 7/04; H01B 7/08; H01B 7/0846; H01B 7/40; H01B 7/0836
See application file for complete search history.

(56) References Cited

U.S. PATENT DOCUMENTS

| | | | | |
|---|---|---|---|---|
| 3,858,160 A | * | 12/1974 | Denton | H01B 17/58 439/459 |
| 4,002,822 A | * | 1/1977 | Kurosaki | H02G 3/0658 16/2.5 |
| 6,161,894 A | * | 12/2000 | Chapman | B60J 5/06 439/162 |
| 6,340,199 B1 | * | 1/2002 | Fukumoto | E05F 15/44 296/155 |
| 7,063,561 B2 | * | 6/2006 | Pabst | H01R 12/61 439/495 |
| 8,586,880 B2 | * | 11/2013 | Zhang | H02G 3/083 174/650 |
| 10,587,106 B1 | * | 3/2020 | Sato | H02G 11/006 |

(Continued)

FOREIGN PATENT DOCUMENTS

| | | |
|---|---|---|
| EP | 1 108 621 A2 | 6/2001 |
| EP | 3 093 929 A1 | 11/2016 |
| JP | 2020-124073 A | 8/2020 |

*Primary Examiner* — Paresh Paghadal
(74) *Attorney, Agent, or Firm* — Sughrue Mion, PLLC (57) ABSTRACT

A wire harness includes an electric wire, an exterior member, and a protector integrally holding an end portion of the exterior member and a portion of the electric wire led out from the end portion of the exterior member. The protector includes a protector main body having a routing space portion in which the electric wire and the exterior member are routed along an axial direction, a lid portion attached to the protector main body to close the routing space portion, and a plurality of first protrusions and second protrusions protruding from the lid portion toward the protector main body and locking the exterior member, and height positions of distal ends of the plurality of first protrusions and second protrusions varies according to a formation position.

10 Claims, 7 Drawing Sheets

(56) References Cited

U.S. PATENT DOCUMENTS

| | | | |
|---|---|---|---|
| 2001/0004022 A1* | 6/2001 | Kobayashi | B60R 16/0207 |
| | | | 174/72 A |
| 2004/0187258 A1 | 9/2004 | Tsuji | |
| 2011/0147078 A1* | 6/2011 | Satou | B60R 16/027 |
| | | | 174/72 A |
| 2012/0037402 A1* | 2/2012 | Kawase | H01R 13/5829 |
| | | | 174/135 |
| 2019/0232897 A1* | 8/2019 | Tomosada | B60R 16/0215 |
| 2019/0267785 A1* | 8/2019 | Gintz | H02G 3/0418 |
| 2020/0099213 A1* | 3/2020 | Sato | B60R 16/0215 |
| 2020/0139907 A1 | 5/2020 | Sano et al. | |
| 2020/0251890 A1 | 8/2020 | Yamauchi et al. | |
| 2021/0291761 A1 | 9/2021 | Nishi et al. | |
| 2022/0169190 A1* | 6/2022 | Kato | B60R 16/0215 |
| 2022/0181858 A1* | 6/2022 | Yamamoto | B60R 16/0215 |
| 2023/0138937 A1* | 5/2023 | Oshino | H02G 3/0456 |
| | | | 174/72 A |

\* cited by examiner

WIRE HARNESS

CROSS-REFERENCE TO RELATED APPLICATION(S)

The present application claims priority to and incorporates by reference the entire contents of Japanese Patent Application No. 2022-022665 filed in Japan on Feb. 17, 2022.

BACKGROUND OF THE INVENTION

1. Field of the Invention

The present invention relates to a wire harness.

2. Description of the Related Art

For example, electric power is supplied to electric components such as a sunroof and a slide door of an automobile through a wire harness. Japanese Patent Application Laid-open No. 2020-124073A describes a routing structure including a protector including a main body portion and a lid portion, an electric wire, and an exterior member, in which the electric wire is inserted into the exterior member, an end portion of the exterior member is fixed to the main body portion, and the electric wire led out from the end portion is routed inside the main body portion. In this type of routing structure, the end portion of the exterior member is locked to the locking groove provided in the inner surface of the main body portion, and the lid portion is fitted to the main body portion to fix the end portion of the exterior member to the protector.

By the way, since the exterior member through which the electric wire is inserted is formed in, for example, a tubular shape having a larger diameter than the electric wire, there is a case where an excess portion such as wrinkles or slack occurs in the circumferential direction of the exterior member. However, even in this case, it is desired that each member is appropriately assembled.

SUMMARY OF THE INVENTION

The present invention has been made in view of the above, and the object is to provide a wire harness in which each member can be appropriately assembled.

In order to achieve the above mentioned object, a wire harness according to one aspect of the present invention includes an electric wire having flexibility; an exterior member through which the electric wire is inserted, the exterior member having flexibility; and a holding member integrally holding an end portion of the exterior member and a portion of the electric wire led out from the end portion of the exterior member, wherein the holding member includes a main body having a routing space portion in which the electric wire and the exterior member are routed along an axial direction, a lid portion attached to the main body to close the routing space portion, and a plurality of protrusions protruding from one of the main body and the lid portion toward the other of the main body and the lid portion and locking the exterior member, and a height position of a distal end of the plurality of protrusions with respect to a height direction intersecting the axial direction varies according to a formation position.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the drawings. Note that the present invention is not limited by the embodiment. In addition, constituent elements in the following embodiments include those that can be easily replaced by those skilled in the art or those that are substantially the same.

Embodiment

Figure 1:
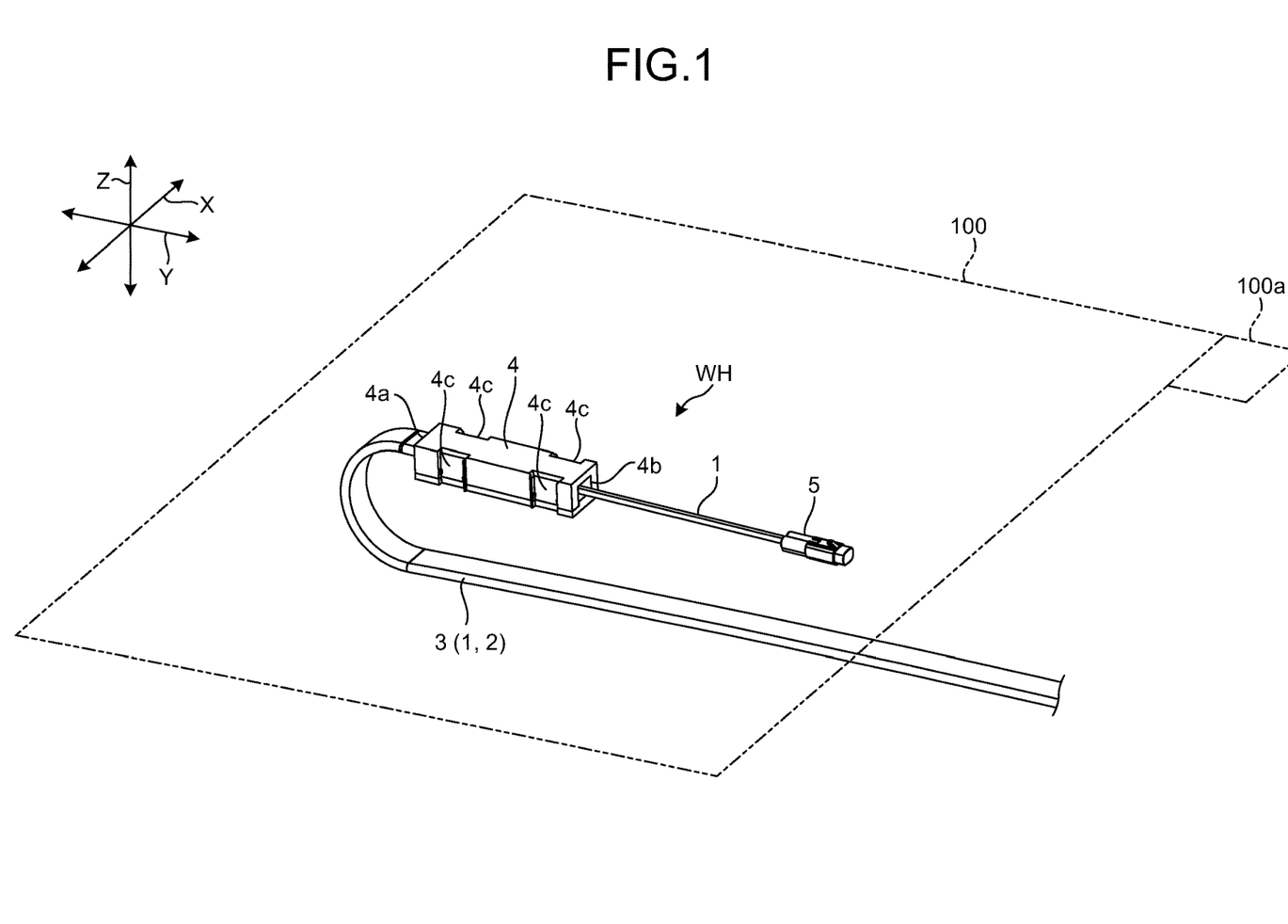
FIG. 1 is a perspective view schematically illustrating a sunroof of an automobile on which a wire harness according to an embodiment is disposed.
Figure 2:
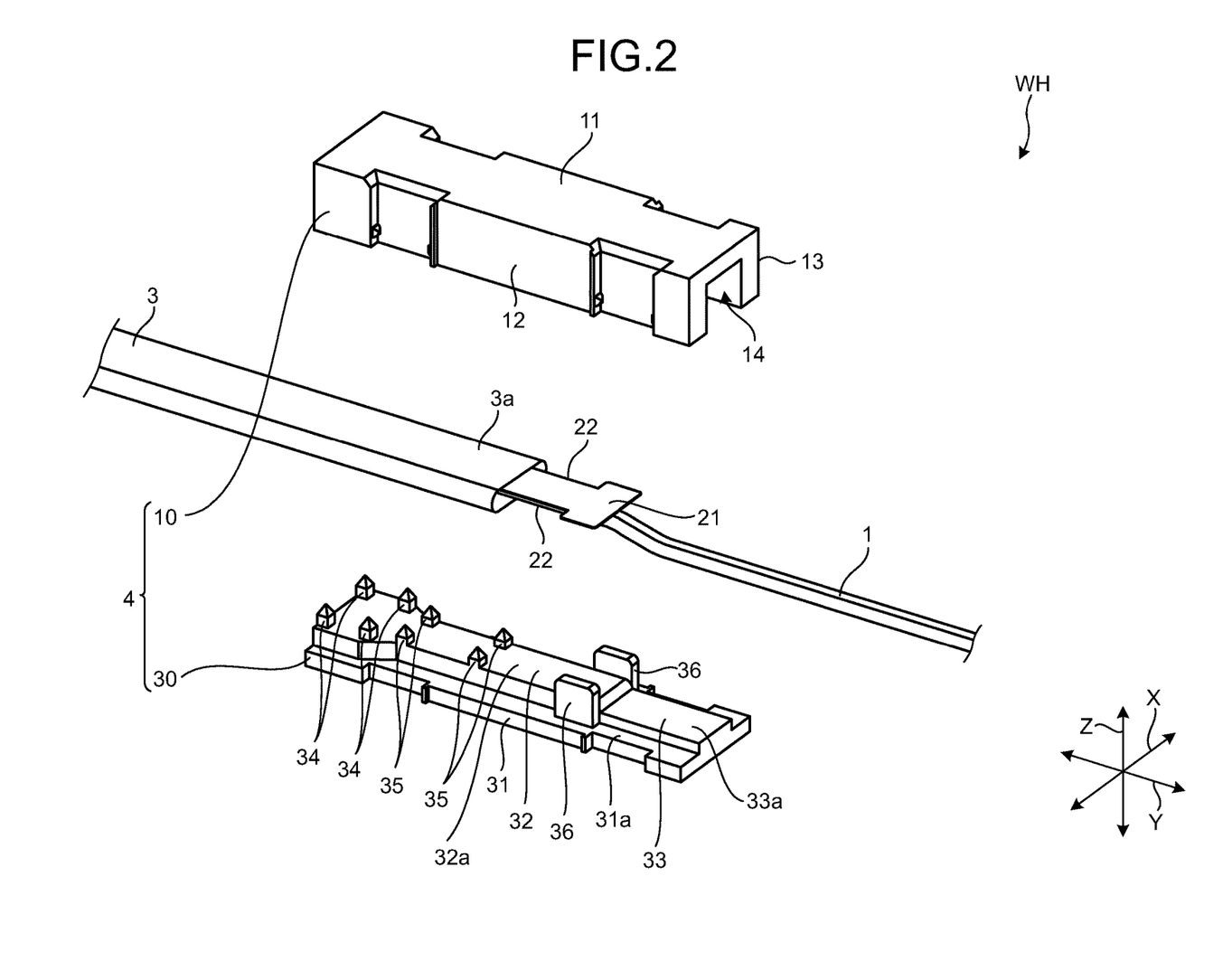
FIG. 2 is an exploded perspective view of the wire harness.
Figure 3:
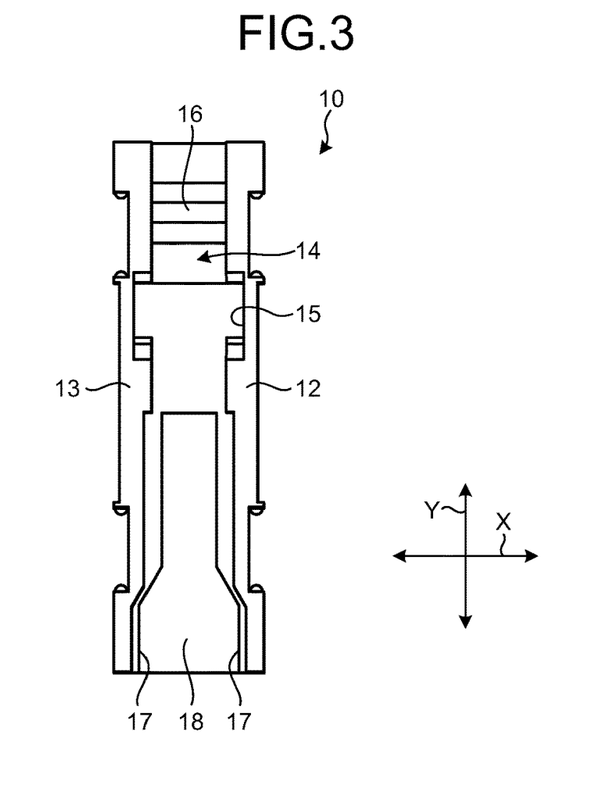
FIG. 3 is a plan view of a protector main body of the wire harness.
Figure 4:
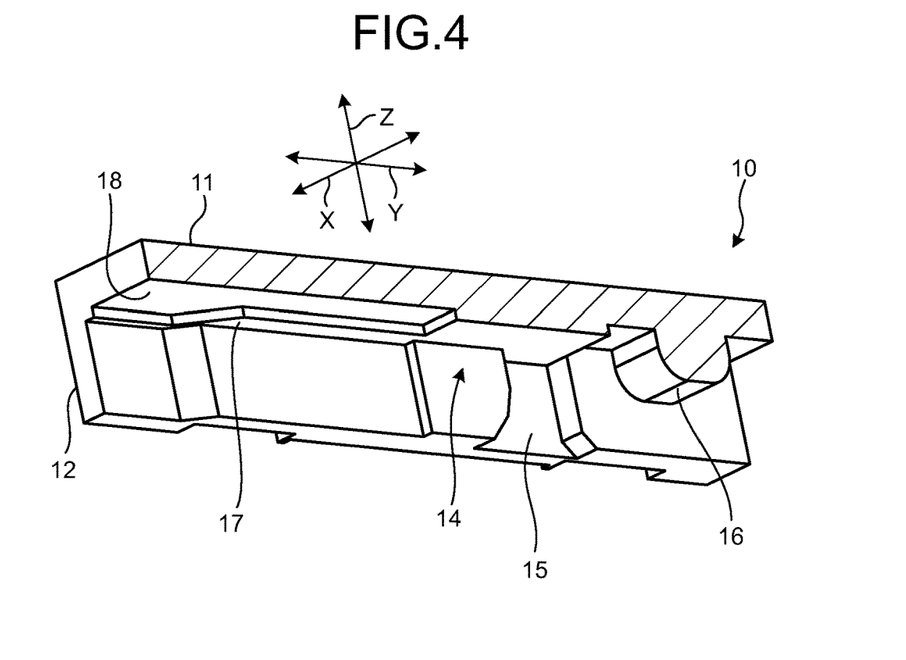
FIG. 4 is a cross-sectional perspective view of the protector main body illustrated in FIG. 3.
Figure 5:
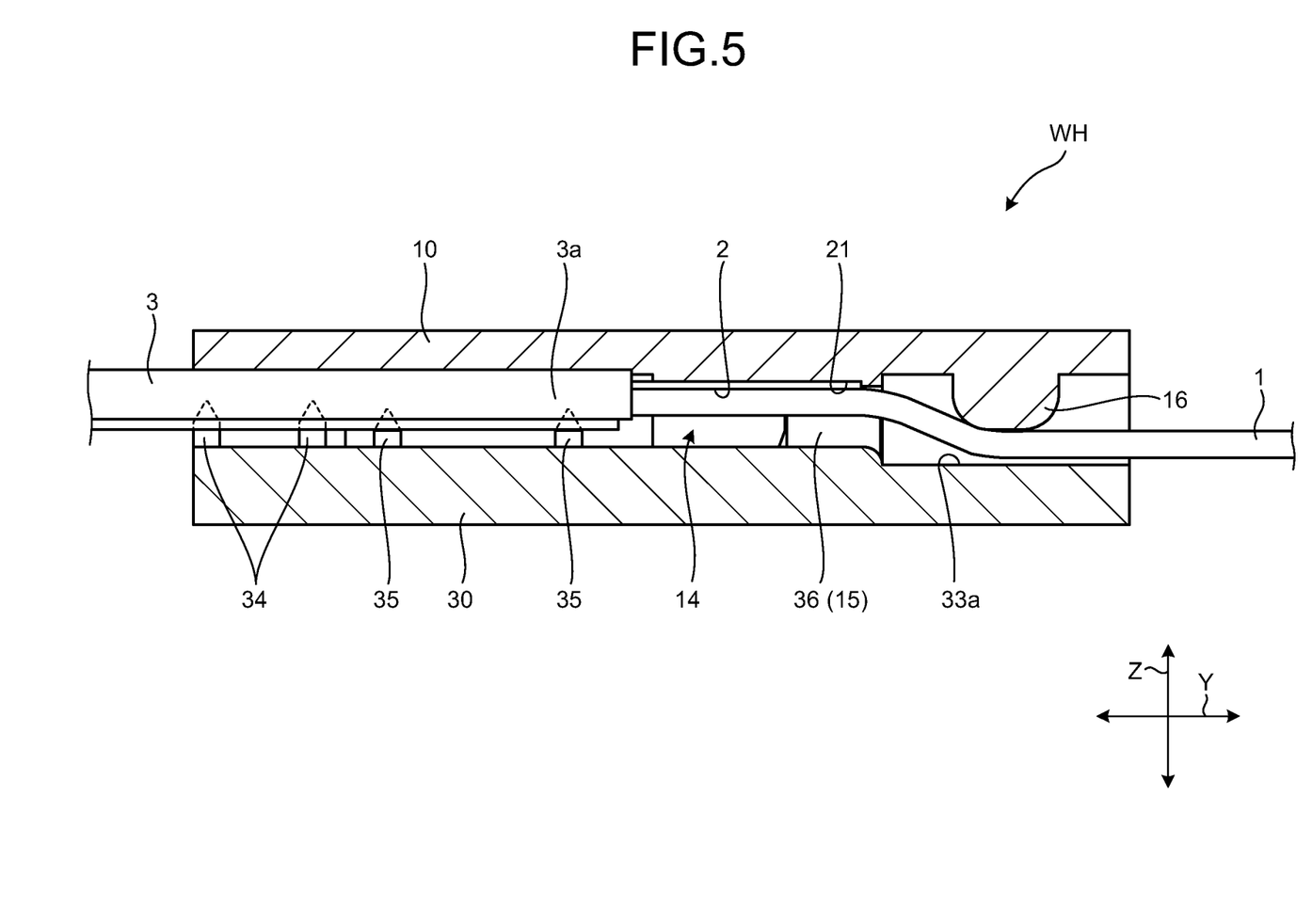
FIG. 5 is an assembled sectional view of the wire harness.

FIG. 1 is a perspective view schematically illustrating a sunroof of an automobile on which a wire harness according to an embodiment is disposed. FIG. 2 is an exploded perspective view of the wire harness according to an embodiment. FIG. 3 is a plan view of a protector main body of the wire harness. FIG. 4 is a cross-sectional perspective view of the protector main body illustrated in FIG. 3. FIG. 5 is an assembled sectional view of the wire harness.

As illustrated in FIG. 1, a wire harness WH of the present embodiment electrically connects, for example, a vehicle body side of the vehicle and a sunroof (glass window) 100, and is used for power supply and signal communication. The sunroof 100 is a moving body that is mounted on a ceiling portion of a vehicle body and slides electrically with respect to the vehicle body. The sunroof 100 includes an electric device 100a such as a switch or a motor operated by electric power supplied from a battery of the vehicle. As illustrated in FIGS. 1 and 2, the wire harness WH includes an electric wire 1, a leaf spring member 2, an exterior member 3, a protector (holding member) 4, and a connector 5. In the present embodiment, the protector 4 of the wire harness WH is attached to the sunroof 100 by, for example, engaging claws of a bracket (not illustrated) with engagement grooves 4c formed on both side surfaces of the protector 4. In addition, the connector 5 provided at the end portion of the electric wire 1 led out from the protector 4 is coupled to the mating connector and connected to the electric device 100*a*.

Note that, in the following description, among the first direction, the second direction, and the third direction intersecting each other, the first direction is referred to as a "width direction X", the second direction is referred to as an "axial direction Y", and the third direction is referred to as a "height direction Z" for convenience. The width direction X, the axial direction Y, and the height direction Z are typically orthogonal to (intersect) each other. Here, the axial direction Y corresponds to the sliding movement direction of the sunroof 100 described above, and corresponds to the axial direction of the protector 4 attached to the sunroof 100. The width direction X and the height direction Z correspond to the width direction and the height direction of the protector 4 attached to the sunroof 100. Note that the height direction Z also includes a state in which the protector 4 is upside down.

The electric wire 1 is a conductive member having flexibility. In the electric wire 1, the outer side of a conductor portion (core wire) made of a plurality of conductive metal strands is covered with a covering portion having an insulating property. In the present embodiment, as illustrated in FIG. 2, the wire harness WH includes two electric wires 1.

The leaf spring member 2 is an elastic member formed in a band shape, extends along the electric wire 1, and regulates a path of the electric wire 1.

The exterior member 3 has flexibility. In the present embodiment, the exterior member 3 is formed by knitting insulating fibers into a tubular shape (tube shape), and the cross-sectional shape is, for example, an oval shape. As illustrated in FIG. 2, the electric wire 1 and the leaf spring member 2 are inserted into the exterior member 3. The electric wire 1 and the leaf spring member 2 are inserted into the exterior member 3 together in a state of being overlapped in the height direction Z. The end portions of the electric wire 1 and the leaf spring member 2 are led out from an end portion 3*a* of the exterior member 3.

An end portion 21 of the leaf spring member 2 has a convex shape protruding in the width direction X intersecting the axial direction Y. Specifically, the leaf spring member 2 has a cutout portion 22 in which both ends in the width direction are partially cut out in the width direction, and the cutout portion 22 forms a convex shape in which the end portion 21 of the leaf spring member 2 relatively protrudes in the width direction X. Note that the end portion 21 of the leaf spring member 2 only needs to have a convex shape relatively protruding in the width direction X, and may have a convex shape with both ends in the width direction protruding in the width direction.

As illustrated in FIG. 1, the protector 4 is made of an insulating synthetic resin and formed in a hollow substantially rectangular tubular shape. In the protector 4, the electric wire 1, the leaf spring member 2, and the exterior member 3 are introduced from a lead-in port 4*a* provided at one end in the axial direction, and the electric wire 1 is led out from a lead-out port 4*b* provided at the other end in the axial direction. In the present embodiment, as illustrated in FIG. 2, the protector 4 routes the electric wire 1, the leaf spring member 2, and the exterior member 3, and integrally holds the end portion 3*a* of the exterior member 3 and the portion of the electric wire 1 and the leaf spring member 2 led out from the end portion 3*a* of the exterior member 3 inside the protector 4.

The protector 4 includes a protector main body (main body) 10 and a lid portion 30. The protector main body 10 includes a first side surface portion 11, a second side surface portion 12, and a third side surface portion 13. In the example of FIG. 2, the protector main body 10 is formed in a U-shape in which the second side surface portion 12 and the third side surface portion 13 face each other and a surface (lower surface) facing the first side surface portion 11 as an upper surface is opened. The protector main body 10 has a routing space portion 14 formed by the first side surface portion 11, the second side surface portion 12, and the third side surface portion 13, and the routing space portion 14 routes the electric wire 1, the leaf spring member 2, and the exterior member 3 along the axial direction Y. In this case, the electric wire 1 and the leaf spring member 2 are inserted into the exterior member 3 in a state of being overlapped with the electric wire 1 in a manner that the leaf spring member 2 is on the side of the protector main body 10. Therefore, in the exterior member 3, the electric wire 1 is positioned on the side of the lid portion 30.

The lid portion 30 is formed in a plate shape, and in the example of FIG. 2, is attached to a surface (lower surface) facing the first side surface portion 11 of the protector main body 10 to close the routing space portion 14 described above. In the present embodiment, the lid portion 30 is attached to the protector main body 10 by being fitted to the second side surface portion 12 and the third side surface portion 13 of the protector main body 10. The lid portion 30 includes a base portion 31, a first fitting stand portion 32, a second fitting stand portion 33, a plurality of first protrusions 34 and second protrusions 35, and a pair of fitting pieces 36. When the protector main body 10 and the lid portion 30 are fitted, the base portion 31 closes the routing space portion 14 to form the side surface of the protector 4.

The first fitting stand portion 32 and the second fitting stand portion 33 are arranged side by side along the axial direction Y on an upper surface (a surface facing the routing space portion 14 of the protector main body 10) 31*a* of the base portion 31. The first fitting stand portion 32 is formed on the side of the lead-in port 4*a* (FIG. 1) in the axial direction Y of the protector 4, and the second fitting stand portion 33 is formed on the side of the lead-out port 4*b*. The first fitting stand portion 32 and the second fitting stand portion 33 have outer side surfaces having the same shape as the inner side surfaces of the second side surface portion 12 and the third side surface portion 13, and are fitted between the second side surface portion 12 and the third side surface portion 13. In the present embodiment, in a case where the upper surface 31*a* of the base portion 31 is used as a reference, the upper surface (surface facing the routing space portion 14 of the protector main body 10) 32*a* of the first fitting stand portion 32 is formed to be higher in height position in the height direction Z than the upper surface (surface facing the routing space portion 14 of the protector main body 10) 33*a* of the second fitting stand portion 33.

The plurality of first protrusions 34 and the plurality of second protrusions 35 are erected to protrude from the upper surface (the surface facing the routing space portion 14 of the protector main body 10) of the first fitting stand portion 32 toward the protector main body 10. As illustrated in FIG. 5, the first protrusion 34 and the second protrusion 35 are locked with the exterior member 3 through which the routing space portion 14 is routed to fix the exterior member 3 in the protector 4. Specifically, since the exterior member 3 is formed by knitting resin fibers, the distal ends of the first protrusion 34 and the second protrusion 35 pierce (penetrate) the gaps between the stitches of the exterior member 3 to lock the exterior member 3. Note that, in the present embodiment, the exterior member 3 is formed by knitting resin fibers, but may be formed of, for example, a flexible material (synthetic rubber and the like) as long as the material is locked with the distal ends of the first protrusion 34 and the second protrusion 35, or may be locked with the distal ends of the first protrusion 34 and the second protrusion 35 in grooves of a corrugated tube.

In the present embodiment, the first protrusion 34 is formed on the side of the lead-in port 4*a* in the axial direction Y of the protector 4, and the second protrusion 35 is formed on the center side in the axial direction Y with respect to the first protrusion 34. In addition, the first protrusion 34 is formed on the outer side in the width direction X of the protector 4, and the second protrusion 35 is formed on the center side (inner side) in the width direction X with respect to the first protrusion 34. In addition, in the plurality of first protrusions 34 and the plurality of second protrusions 35, the height position of the distal end with respect to the height direction Z of the protector 4 is different according to the formation position of each protrusion.

The pair of fitting pieces 36 is arranged side by side in the width direction X with the first fitting stand portion 32 interposed between, and is erected on the upper surface 31*a* of the base portion 31. In addition, the pair of fitting pieces 36 is formed on the side of the second fitting stand portion 33 of the first fitting stand portion 32 in the axial direction Y. These fitting pieces 36 are fitted into concave portions 15 formed on each inner surface of the second side surface portion 12 and the third side surface portion 13 of the protector main body 10.

On the other hand, as illustrated in FIGS. 3 and 4, the protector main body 10 includes the concave portion 15 and a protrusion portion 16 formed on the inner surface exposed to the routing space portion 14. The protrusion portion 16 is formed on the side of the lead-out port 4*b* (FIG. 1) in the axial direction Y of the protector 4 and protrudes toward the lid portion 30. As illustrated in FIG. 5, the protrusion portion 16 is formed to face an upper surface 33*a* of the second fitting stand portion 33 of the lid portion 30, and sandwiches a part of the electric wire 1 led out from the end portion 3*a* of the exterior member 3 and routed in the routing space portion 14 between the protrusion portion and the upper surface 33*a* of the second fitting stand portion 33.

In the present embodiment, the electric wire 1 is disposed on the side of the lid portion 30 than the leaf spring member 2, and the protrusion portion 16 protrudes from the protector main body 10 toward the lid portion 30. Therefore, in a case where the electric wire 1 is sandwiched between the protrusion portion 16 and the upper surface 33*a* of the second fitting stand portion 33, the electric wire 1 can be easily separated from the leaf spring member 2. Therefore, for example, it is possible to prevent the electric wire 1 from coming into contact with the end portion of the leaf spring member 2, and it is possible to make the electric wire 1 less likely to be damaged. In addition, as illustrated in FIGS. 4 and 5, the protrusion portion 16 has a curved surface facing the electric wire 1 in the axial cross section. Therefore, in a case where the electric wire 1 is sandwiched between the protrusion portion 16 and the upper surface 33*a* of the second fitting stand portion 33, it is possible to suppress damaging of the electric wire 1 due to the sandwiching.

As illustrated in FIG. 5, the concave portion 15 is formed between the protrusion portion 16 and the first protrusion 34 and the second protrusion 35 provided on the lid portion 30 in the axial direction Y. The concave portion 15 is formed on each inner surface of the second side surface portion 12 and the third side surface portion 13, and is engaged with the convex end portion 21 of the leaf spring member 2 to position the end portion 21 of the leaf spring member 2 in the axial direction Y. In a case where the wire harness WH is assembled, the electric wire 1 and the leaf spring member 2 inserted into the exterior member 3 are disposed in the routing space portion 14, and the convex end portion 21 of the leaf spring member 2 is engaged with the concave portion 15 of the protector main body 10. As a result, the positioning of the end portion 21 of the leaf spring member 2 in the axial direction Y can be made easy, and the electric wire 1, the leaf spring member 2, and the exterior member 3 can be assembled to the protector main body 10. Further, the pair of fitting pieces 36 provided on the lid portion 30 is fitted into the concave portion 15. As a result, by assembling the lid portion 30 to the protector main body 10, the end portion 21 of the leaf spring member 2 is prevented from being detached from the concave portion 15, and the leaf spring member 2 can be fixed to the protector 4.

By the way, since the exterior member 3 through which the electric wire 1 and the leaf spring member 2 are inserted is formed in, for example, a tubular shape having a larger diameter than the electric wire 1 and the leaf spring member 2, an excess portion such as wrinkles and slack is generated in the circumferential direction of the exterior member 3, and there is a possibility that variations occur in the assembling positions of the respective members (electric wire 1, leaf spring member 2, and exterior member 3) in the protector 4 due to the presence of the excess portion. In addition, the wire harness WH according to the present embodiment connects the vehicle body side of the vehicle and the sunroof 100, for example, and the position and shape of the wire harness WH fluctuate following the sliding movement of the sunroof 100. Therefore, in the wire harness WH, it is desired to assemble each member in the protector 4 in an appropriate positional relationship in order to achieve stable operation.

Figure 6:
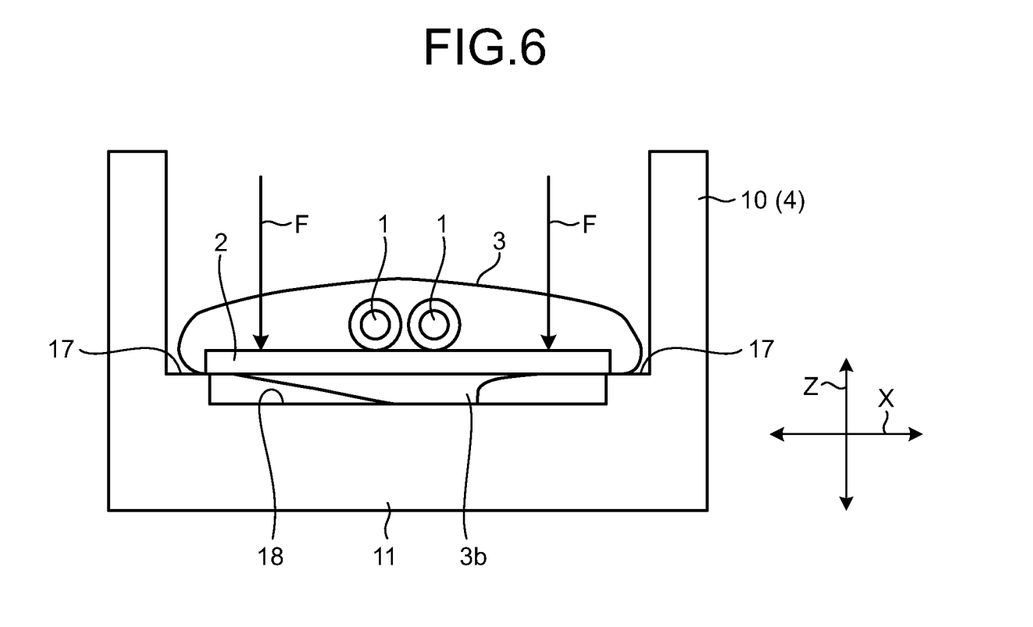
FIG. 6 is a schematic view illustrating a positional relationship of each member assembled to the protector main body.
Figure 7:
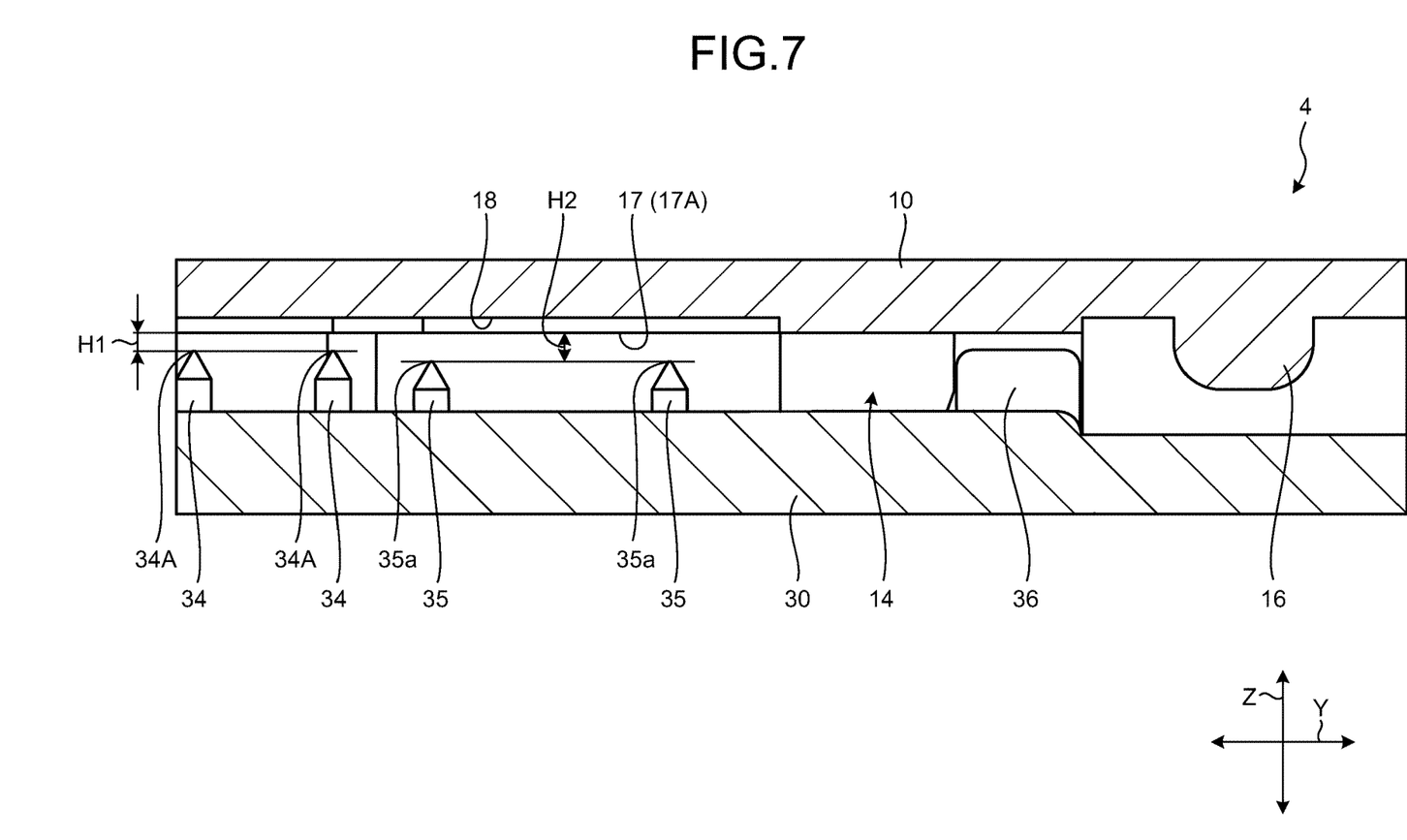
FIG. 7 is a cross-sectional view of the protector in an axial direction.
Figure 8:
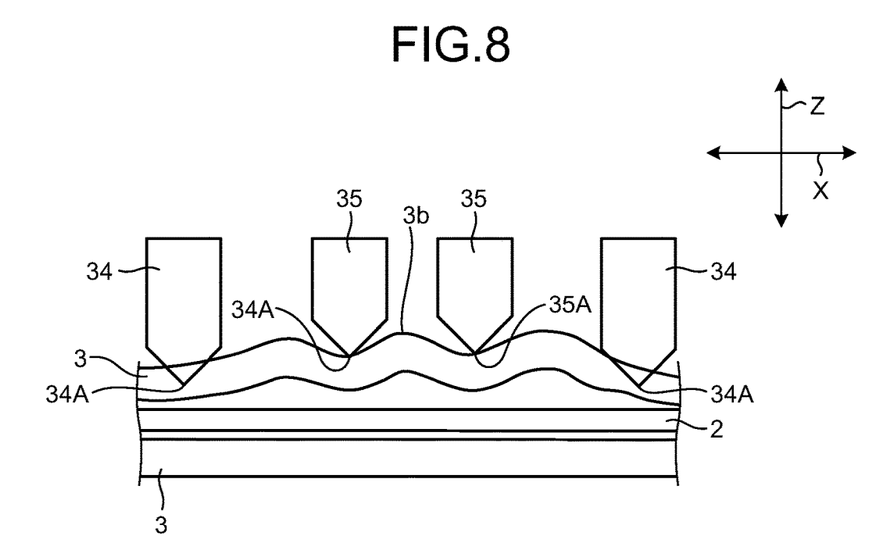
FIG. 8 is a schematic view illustrating a positional relationship between a plurality of protrusions and each member.

Next, a structure for assembling each member (electric wire 1, leaf spring member 2, and exterior member 3) in the protector 4 in an appropriate positional relationship will be described. FIG. 6 is a schematic view illustrating a positional relationship of each member assembled to the protector main body. FIG. 7 is a cross-sectional view of the protector in an axial direction. FIG. 8 is a schematic view illustrating a positional relationship between a plurality of protrusions and each member. In FIG. 6, illustration of the lid portion is omitted, and in FIG. 8, illustration of the electric wire and the protector main body is omitted, and a state in which the top and the bottom are inverted as compared with FIG. 2 is illustrated.

As illustrated in FIGS. 3, 4, and 6, the protector main body 10 includes a regulation portion 17 formed on the inner surface exposed to the routing space portion 14 and a housing concave portion 18. The regulation portion 17 and the housing concave portion 18 are provided on a side opposite to the first protrusion 34 and the second protrusion 35 in the height direction Z. As illustrated in FIG. 6, the regulation portion 17 is formed on both sides in the width direction X on the inner surface side of the first side surface portion 11, and supports both end portions in the width direction X of the leaf spring member 2 routed in the routing space portion 14 via the exterior member 3. In addition, the regulation portion 17 regulates the height position of the leaf spring member 2 in the protector main body 10 (protector 4) in the height direction Z.

In the present embodiment, as illustrated in FIG. 1, the leaf spring member 2 is curved in a substantially U shape outside the protector 4 together with the electric wire 1 and the exterior member 3. That is, the leaf spring member 2 is folded back in the axial direction Y outside the protector 4 and passes under the protector 4 in the height direction Z. Therefore, a biasing force generated by bending acts on the end portion of the leaf spring member 2, and as illustrated in FIG. 6, the leaf spring member 2 in the protector main body 10 (protector 4) is constantly pressed against the regulation portion 17 by the biasing force F. As a result, the height position of the leaf spring member 2 in the protector 4 can be set to the position (reference position) of the regulation portion 17.

As illustrated in FIG. 6, the housing concave portion 18 is a concave portion that is positioned between the pair of regulation portions 17 and is formed to be separated from the leaf spring member 2 in the height direction Z with respect to the regulation portion 17. As described above, the housing concave portion 18 houses an excess portion 3$b$ such as wrinkles and slack generated in the circumferential direction of the exterior member 3, for example. In the configuration in which the housing concave portion is not provided, the excess portion 3$b$ of the exterior member 3 is interposed between the leaf spring member 2 and the regulation portion 17, the leaf spring member 2 cannot be positioned at the reference position, and variation occurs in the assembling positions of the respective members. Furthermore, there is also a possibility that proper attachment of the lid portion 30 is hindered by the excess portion 3$b$ of the exterior member 3.

In the present embodiment, by providing the housing concave portion 18 positioned between the pair of regulation portions 17 and formed to be separated from the leaf spring member 2 in the height direction Z with respect to the regulation portions 17, for example, in a case where the excess portion 3$b$ such as wrinkles or slack is generated in the circumferential direction of the exterior member 3, the excess portion 3$b$ is housed in the housing concave portion 18. Therefore, regardless of the excess portion 3$b$, the height position of the leaf spring member 2 can be set to the reference position, the lid portion 30 can be appropriately attached, and each member can be assembled in an appropriate positional relationship.

As described above, the lid portion 30 is provided with the plurality of first protrusions 34 and second protrusions 35. As illustrated in FIG. 7, these first protrusions 34 and the second protrusions 35 have different height positions of distal ends 34$a$ and 35$a$ in the height direction according to the formation positions. For example, in the case of a virtual plane 17A formed by the pair of regulation portions 17 and 17 described above, a gap H2 from the virtual plane 17A to a distal end 35A of the second protrusion 35 is larger than a gap H1 from the virtual plane 17A to a distal end 34A of the first protrusion 34.

As described above, the regulation portion 17 supports the leaf spring member 2 via the exterior member 3 and regulates the height position of the leaf spring member 2 with respect to the height direction Z. Therefore, in a case where the leaf spring member 2 supported by the regulation portion 17 is used as a reference, the distal end 35$a$ of the second protrusion 35 is higher in height position (larger in gap) than the distal end 34$a$ of the first protrusion 34.

Usually, the excess portion 3$b$ generated in the circumferential direction of the exterior member 3 is easily generated on the inner side (center side) in the width direction of the exterior member 3. In the present embodiment, as illustrated in FIG. 8, since the distal end 35$a$ of the second protrusion 35 formed on the inner side in the width direction X is higher in height position than the distal end 34$a$ of the first protrusion 34 formed on the outer side in the width direction X, the excess portion 3$b$ can be absorbed between the leaf spring member 2 and the distal end 35$a$ of the second protrusion 35. Therefore, the lid portion 30 can be appropriately attached, and each member can be assembled in an appropriate positional relationship.

Figure 9:
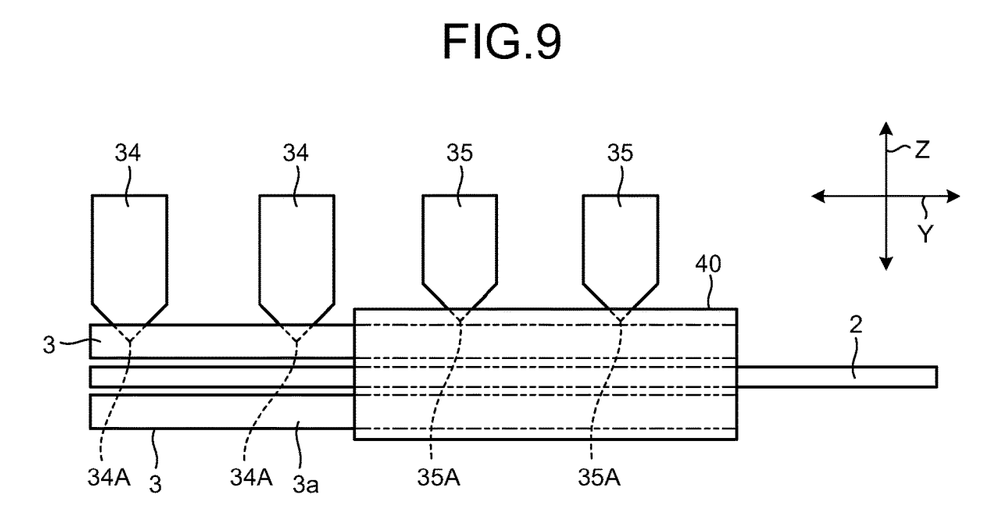
FIG. 9 is a schematic view illustrating a positional relationship between an exterior member and a plurality of protrusions according to a modification.

Next, a modification will be described. FIG. 9 is a schematic view illustrating a positional relationship between an exterior member and a plurality of protrusions according to a modification. Also in FIG. 9, illustration of the electric wire and the protector main body is omitted, and a state in which the top and the bottom are inverted as compared with FIG. 2 is illustrated.

In this modification, an adhesive tape 40 is wound around the end portion 3$a$ of the exterior member 3 (a part housed on the inner side of the holding member), and the end portion 3$a$ of the exterior member 3 and the leaf spring member 2 (and the electric wire) led out from the end portion 3$a$ are fixed by the adhesive tape 40. Also in this case, as illustrated in FIG. 9, the distal end 35$a$ of the second protrusion 35 corresponding to the region where the adhesive tape 40 is disposed in the axial direction Y has a higher height position (larger gap) with respect to the leaf spring member 2 than the distal end 34$a$ of the first protrusion 34 corresponding to the region where the adhesive tape 40 is not disposed. Therefore, even in a case where the adhesive tape 40 is wound around the end portion 3$a$ of the exterior member 3, the thickness of the adhesive tape 40 can be absorbed between the leaf spring member 2 and the distal end 35$a$ of the second protrusion 35. Therefore, the lid portion 30 can be appropriately attached, and each member can be assembled in an appropriate positional relationship.

As described above, the wire harness WH according to the present embodiment includes the electric wire 1 having flexibility, the exterior member 3 through which the electric wire 1 is inserted, the exterior member 3 having flexibility, and the protector 4 integrally holding the end portion 3$a$ of the exterior member 3 and the portion of the electric wire 1 led out from the end portion 3$a$ of the exterior member 3. The protector 4 includes the protector main body 10 having the routing space portion 14 in which the electric wire 1 and the exterior member 3 are routed along the axial direction Y, the lid portion 30 attached to the protector main body 10 to close the routing space portion 14, and the plurality of first protrusions 34 and second protrusions 35 protruding from the lid portion 30 toward the protector main body 10 and locking the exterior member 3, and height positions of distal ends 34$a$ and 35$a$ of the plurality of first protrusions 34 and second protrusions 35 with respect to a height direction Z intersecting the axial direction Y varies according to a formation position.

According to this configuration, for example, even in a case where the excess portion 3$b$ such as wrinkles or slack is generated in the circumferential direction of the exterior member 3, the first protrusions 34 and the second protrusions 35 having different heights can absorb the excess portion 3$b$. Therefore, the lid portion 30 can be appropriately attached to the protector main body 10, and each member can be assembled in the protector 4 in an appropriate positional relationship.

In addition, the wire harness WH according to the present embodiment includes the leaf spring member 2 extending along the electric wire 1, regulating the path of the electric wire 1, having elasticity, and being inserted into the exterior member 3 together with the electric wire 1. The protector main body 10 includes a pair of regulation portions 17 that supports both ends in the width direction of the leaf spring member 2 routed in the routing space portion 14 via the exterior member 3 and regulates the height position of the leaf spring member 2 in the protector 4 with respect to the height direction Z intersecting the axial direction Y. The height positions of the distal ends 34$a$ and 35$a$ of the plurality of first protrusions 34 and the second protrusions 35 with respect to the leaf spring member 2 supported by the pair of regulation portions 17 varies according to a formation position. According to this configuration, since the regulation portions 17 regulate the height position of the leaf spring member 2 with respect to the height direction Z, it is possible to effectively absorb the excess portion 3$b$ generated in the circumferential direction of the exterior member 3 by making the height positions of the distal ends 34$a$ and 35$a$ of the first protrusions 34 and the second protrusions 35 different from each other with respect to the leaf spring member 2 supported by the regulation portions 17.

In addition, in the wire harness WH according to the present embodiment, the distal end 35$a$ of the second protrusion 35 on the inner side in the width direction of the protector 4 is higher in height position with respect to the leaf spring member 2 supported by the regulation portion 17 via the exterior member 3 than the distal end 34$a$ of the first protrusion 34 on the outer side in the width direction. According to this configuration, it is possible to effectively absorb the excess portion 3$b$ which is likely to occur on the inner side in the width direction of the exterior member 3.

In the wire harness WH according to the present embodiment, in a case where the adhesive tape 40 is wound around the end portion 3$a$ of the exterior member 3, the height position of the distal end of the second protrusion 35 corresponding to the region where the adhesive tape 40 is disposed in the axial direction Y of the exterior member 3 with respect to the leaf spring member 2 is higher than the height position of the distal end of the first protrusion 34 corresponding to the region where the adhesive tape 40 is not disposed. According to this configuration, even in a case where the adhesive tape 40 is wound around the end portion 3$a$ of the exterior member 3, the thickness of the adhesive tape 40 can be absorbed between the leaf spring member 2 and the distal end 35$a$ of the second protrusion 35.

In the wire harness WH according to the present embodiment, the exterior member 3 is formed by knitting insulating fibers into a tubular shape. According to this configuration, the distal ends of the first protrusion 34 and the second protrusion 35 can pierce (penetrate) the gaps between the stitches of the exterior member 3 to lock the exterior member 3.

Note that the wire harness WH according to the embodiment of the present invention described above is not limited to the embodiment described above, and various modifications can be made within the scope described in the claims. For example, in the present embodiment, the protector main body 10 is provided with the protrusion portion 16 that sandwiches a part of the electric wire 1, but the present embodiment is not limited to this, and the protrusion portion 16 may protrude from the lid portion 30 toward the protector main body 10. In addition, although the plurality of first protrusions 34 and the second protrusions 35 for locking the exterior member 3 are provided on the lid portion 30, the first protrusions 34 and the second protrusions 35 may be provided from the protector main body 10 toward the lid portion 30.

In addition, in the present embodiment, the exterior member 3 has been described as being formed by knitting insulating fibers into a tubular shape, but the present embodiment is not limited to this as long as the exterior member 3 can be locked to the first protrusion 34 and the second protrusion 35, and for example, a rubber-based material having flexibility may be used. In addition, like a corrugated tube, a plurality of groove portions engaged with the distal ends of the protrusions may be provided.

In addition, in the present embodiment, the reference of the height positions of the distal ends of the first protrusion 34 and the second protrusion 35 with respect to the height direction Z is the leaf spring member 2, but the present embodiment is not limited to this, and for example, the upper surface 32$a$ of the first fitting stand portion 32 of the lid portion 30 may be used as the reference. In this case, the height position of the distal end of the first protrusion 34 is higher than the height position of the second protrusion 35.

In addition, in the present embodiment, an example of a pattern in which the height positions of the plurality of first protrusions 34 and second protrusions 35 are different according to the formation position has been described, but the present embodiment is not limited to this, and various patterns can be adopted as long as the height positions of the respective protrusions are different.

In addition, in the present embodiment, the sunroof 100 has been described as a moving body provided with the wire harness WH, but it is needless to say that the wire harness WH can be provided on a slide door, for example.

According to the wire harness of the present embodiment, there is an effect that each member can be assembled in an appropriate positional relationship.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
   an electric wire having flexibility;
   an exterior member through which the electric wire is inserted, the exterior member having flexibility; and
   a holding member integrally holding an end portion of the exterior member and a portion of the electric wire led out from the end portion of the exterior member, wherein
   the holding member includes
      a main body having a routing space portion in which the electric wire and the exterior member are routed along an axial direction of the wire harness,
      a lid portion attached to the main body to close the routing space portion, and
      a plurality of protrusions protruding from only one of the main body and the lid portion toward the other of the main body and the lid portion, extending into and locking the exterior member through which the electric wire is inserted, and
   a height position of a distal end of the plurality of protrusions with respect to a height direction intersecting the axial direction varies according to a formation of the plurality of protrusions relative to a width direction intersecting the axial direction and the height direction.

2. The wire harness according to claim 1, further comprising:
   a leaf spring member extending along the electric wire, regulating a path of the electric wire, having elasticity, and being inserted into the exterior member together with the electric wire, wherein
   the main body includes a pair of regulation portions that supports both ends in a width direction of the leaf spring member routed in the routing space portion via the exterior member and regulates a height position of the leaf spring member in the holding member with respect to the height direction intersecting the axial direction, and the height position of the distal end of the plurality of protrusions with respect to the leaf spring member supported by the pair of regulation portions varies according to the formation of the plurality of protrusions.

3. The wire harness according to claim 1, wherein the exterior member is formed by knitting insulating fibers into a tubular shape.

4. The wire harness according to claim 2, wherein the exterior member is formed by knitting insulating fibers into a tubular shape.

5. A wire harness comprising:

an electric wire having flexibility;

an exterior member through which the electric wire is inserted, the exterior member having flexibility;

a holding member integrally holding an end portion of the exterior member and a portion of the electric wire led out from the end portion of the exterior member; and a leaf spring member extending along the electric wire, regulating a path of the electric wire, having elasticity, and being inserted into the exterior member together with the electric wire, wherein the holding member includes
 a main body having a routing space portion in which the electric wire and the exterior member are routed along an axial direction of the wire harness,
 a lid portion attached to the main body to close the routing space portion, and
 a plurality of protrusions protruding from one of the main body and the lid portion toward the other of the main body and the lid portion and locking the exterior member, a height position of a distal end of the plurality of protrusions with respect to a height direction intersecting the axial direction varies according to a formation of the plurality of protrusions, the main body includes a pair of regulation portions that supports both ends in a width direction of the leaf spring member routed in the routing space portion via the exterior member and regulates a height position of the leaf spring member in the holding member with respect to the height direction intersecting the axial direction, the height position of the distal end of the plurality of protrusions with respect to the leaf spring member supported by the pair of regulation portions varies according to the formation of the plurality of protrusions, and the height position of the distal end of one of the plurality of protrusions on an inner side in a width direction of the holding member with respect to the leaf spring member supported by one of the pair of regulation portions via the exterior member is higher than the height position of the distal end of another of the plurality of protrusions on an outer side in the width direction.

6. The wire harness according to claim 5, wherein the exterior member has a configuration in which an adhesive tape is wound around a part housed on an inner side of the holding member, and among the plurality of protrusions, a protrusion corresponding to a region where the adhesive tape is disposed in an axial direction of the holding member is higher in height position of the distal end with respect to the leaf spring member supported by one of the pair of regulation portions via the exterior member than another protrusion corresponding to a region where the adhesive tape is not disposed.

7. The wire harness according to claim 6, wherein the exterior member is formed by knitting insulating fibers into a tubular shape.

8. The wire harness according to claim 5, wherein the exterior member is formed by knitting insulating fibers into a tubular shape.

9. A wire harness comprising:

an electric wire having flexibility;

an exterior member through which the electric wire is inserted, the exterior member having flexibility;

a holding member integrally holding an end portion of the exterior member and a portion of the electric wire led out from the end portion of the exterior member; and a leaf spring member extending along the electric wire, regulating a path of the electric wire, having elasticity, and being inserted into the exterior member together with the electric wire, wherein the holding member includes
 a main body having a routing space portion in which the electric wire and the exterior member are routed along an axial direction of the wire harness,
 a lid portion attached to the main body to close the routing space portion, and
 a plurality of protrusions protruding from one of the main body and the lid portion toward the other of the main body and the lid portion and locking the exterior member, a height position of a distal end of the plurality of protrusions with respect to a height direction intersecting the axial direction varies according to a formation of the plurality of protrusions, the main body includes a pair of regulation portions that supports both ends in a width direction of the leaf spring member routed in the routing space portion via the exterior member and regulates a height position of the leaf spring member in the holding member with respect to the height direction intersecting the axial direction, the height position of the distal end of the plurality of protrusions with respect to the leaf spring member supported by the pair of regulation portions varies according to the formation of the plurality of protrusions, the exterior member has a configuration in which an adhesive tape is wound around a part housed on an inner side of the holding member, and among the plurality of protrusions, a protrusion corresponding to a region where the adhesive tape is disposed in an axial direction of the holding member is higher in height position of the distal end with respect to the leaf spring member supported by one of the pair of regulation portions via the exterior member than another protrusion corresponding to a region where the adhesive tape is not disposed.

10. The wire harness according to claim 9, wherein the exterior member is formed by knitting insulating fibers into a tubular shape.

* * * * *